(12) United States Patent
Schilder et al.

(10) Patent No.: US 12,311,756 B1
(45) Date of Patent: May 27, 2025

(54) ELECTRIC DRIVE UNIT FOR A MOTOR VEHICLE, IN PARTICULAR FOR A MOTOR CAR

(71) Applicant: MERCEDES-BENZ GROUP AG, Stuttgart (DE)

(72) Inventors: Tobias Schilder, Ludwigsburg (DE); Tobias Haerter, Stuttgart (DE); Jonathan Zeibig, Aalen (DE); Philip Gansloser, Bad Ditzenbach (DE); Carsten Gitt, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/836,205

(22) PCT Filed: Feb. 3, 2023

(86) PCT No.: PCT/EP2023/052671
§ 371 (c)(1),
(2) Date: Aug. 6, 2024

(87) PCT Pub. No.: WO2023/148327
PCT Pub. Date: Aug. 10, 2023

(30) Foreign Application Priority Data

Feb. 7, 2022 (DE) .................. 10 2022 000 462.3

(51) Int. Cl.
*B60K 7/00* (2006.01)
*B60K 17/04* (2006.01)
(Continued)

(52) U.S. Cl.
CPC ............ *B60K 17/16* (2013.01); *B60K 17/046* (2013.01); *B60K 7/0007* (2013.01);
(Continued)

(58) Field of Classification Search
CPC .... B60K 17/16; B60K 17/046; B60K 7/0007; B60K 2007/0061; B60K 2007/0092; B60K 2023/043; F16H 37/0806; F16H 48/06
See application file for complete search history.

(56) References Cited

U.S. PATENT DOCUMENTS 8,651,991 B1  2/2014 Sten et al.
9,701,187 B2  7/2017 Smetana et al.
(Continued)

FOREIGN PATENT DOCUMENTS

CN    113696676 A   11/2021
DE    102012016508 A1   5/2014
(Continued)

OTHER PUBLICATIONS

Office Action dated Feb. 26, 2025 in related/corresponding U.S. Appl. No. 18/836,211.

(Continued)

*Primary Examiner* — Justin Holmes
(74) *Attorney, Agent, or Firm* — PATENT PORTFOLIO BUILDERS PLLC (57) ABSTRACT

An electric drive unit includes a first electric engine having a first rotor, a second electric engine having a second rotor, and a transmission unit having a differential transmission with exactly three first shafts arranged coaxially with one another. The three first shafts are a sum shaft to which the first rotor is connected such that torques provided by the first rotor can be introduced into the transmission unit via the sum shaft, a first differential shaft coupled to a first vehicle wheel such that torques can be discharged from the transmission unit and transmitted to the first vehicle wheel via the first differential shaft, and a second differential shaft coupled to a second vehicle wheel such that torques can be dis- (Continued)

charged from the transmission unit and transmitted to the second vehicle wheel via the second differential shaft.

9 Claims, 3 Drawing Sheets

(51) Int. Cl.
*B60K 17/16* (2006.01)
*B60K 23/04* (2006.01)
*F16H 37/08* (2006.01)
*F16H 48/06* (2006.01)

(52) U.S. Cl.
CPC .............. *B60K 2007/0061* (2013.01); *B60K 2007/0092* (2013.01); *B60K 2023/043* (2013.01); *F16H 37/0806* (2013.01); *F16H 48/06* (2013.01)

(56) References Cited

U.S. PATENT DOCUMENTS

| | | | |
|---|---|---|---|
| 10,641,375 B2 | 5/2020 | Kurth | |
| 2015/0192192 A1* | 7/2015 | Honda | F16H 48/11 475/10 |
| 2019/0072168 A1* | 3/2019 | Yamamura | B60K 1/00 |
| 2020/0282827 A1 | 9/2020 | Kaltenbach et al. | |
| 2022/0410684 A1 | 12/2022 | Wang et al. | |

FOREIGN PATENT DOCUMENTS

| | | | |
|---|---|---|---|
| DE | 102013202382 A1 | | 8/2014 |
| DE | 102014103485 A1 | | 9/2014 |
| DE | 102014210549 A1 | | 12/2015 |
| DE | 102015223131 A1 | | 5/2017 |
| DE | 102018117206 A1 | | 1/2020 |
| DE | 102022000462 B3 | | 3/2023 |
| DE | 102022000463 B3 | | 3/2023 |
| EP | 3348867 A1 | | 7/2018 |
| EP | 3140144 B1 | | 12/2019 |
| GB | 2348253 A | | 9/2000 |
| GB | 2466975 A | * | 7/2010 .............. B60K 6/52 |
| JP | H05169991 A | | 7/1993 |
| JP | 5951410 B2 | * | 7/2016 |
| JP | 2019044865 A | | 3/2019 |
| JP | 2021156378 A | | 10/2021 |

OTHER PUBLICATIONS

International Search Report and Written Opinion mailed May 10, 2023 in related/corresponding International Application No. PCT/EP2023/052669.
International Search Report and Written Opinion mailed May 10, 2023 in related/corresponding International Application No. PCT/EP2023/052671.
Office Action created Jul. 7, 2022 in related/corresponding DE Application No. 10 2022 000 463.1.
Office Action created Jun. 30, 2022 in related/corresponding DE Application No. 10 2022 000 462.3.

* cited by examiner

ELECTRIC DRIVE UNIT FOR A MOTOR VEHICLE, IN PARTICULAR FOR A MOTOR CAR

BACKGROUND AND SUMMARY OF THE INVENTION

Exemplary embodiments of the invention relate to an electric drive unit for a motor vehicle, in particular for a motor car.

A torque distribution device should be taken as known from EP 3 348 867 A1, having a torque distribution motor, a first sun gear, and a plurality of first planetary gears arranged on an external periphery side of the first sun gear and engage in the first sun gear. A second sun gear is also provided, of which the gearing diameter is greater than a gearing diameter of the first sun gear.

Drive units for motor vehicles that have one or two drive engines and a torque distribution device, also called a torque vectoring device, are further known from U.S. Pat. No. 8,651,991 B1, DE 10 2018 117 206 A1, DE 10 2015 223 131 A1 and EP 3 140 144B1.

Exemplary embodiments of the present invention are directed to an electric drive unit for a motor vehicle, in particular for a motor car, such that a particularly advantageous torque distribution can be implemented while implementing high torques and a high efficiency.

The invention relates to an electric drive unit for a motor vehicle, in particular for a motor car preferably designed as a passenger car. This means that, when fully manufactured, the motor vehicle has the electric drive unit, and can be driven electrically, in particular purely electrically, by means of the electric drive unit. For example, when fully manufactured, the motor vehicle also simply described as a vehicle has at least or exactly two axles arranged one after the other, and thus one behind the other, in the longitudinal direction of the vehicle, the axles also being described as vehicle axles. The respective vehicle axle has at least or exactly two vehicle wheels also described as wheels, wherein the respective vehicle wheels of the respective vehicle axle are, for example, arranged on opposite sides of the motor vehicle in the transverse direction of the vehicle. The electric drive unit is, for example, a component of, in particular, exactly one of the vehicle axles, wherein the vehicle wheels of the one vehicle axle can be driven electrically, in particular purely electrically, by means of the electric drive unit. Where vehicle wheels are mentioned in the following, the vehicle wheels of the one vehicle axle that can be driven electrically, in particular purely electrically, by means of the electric drive unit should be understood to be meant unless otherwise specified. The motor vehicle as a whole can be driven electrically, in particular purely electrically, by driving the vehicle wheels. The vehicle wheels of the one vehicle axle and the vehicle wheels of the other vehicle axle are ground contact elements, via which the motor vehicle is or can be supported downwards in the vertical direction of the vehicle on the ground. If the motor vehicle is driven along the ground while the motor vehicle is supported downwards in the vertical direction of the vehicle on the ground via the ground contact elements, then the vehicle wheels, and thus the ground contact elements, roll, in particular directly, along the ground. The electric drive unit has a first electric engine, which has a first rotor. In particular, the first electric engine also has a first stator. For example, the first rotor can be driven by means of the first stator and can thus be rotated around a first engine axis of rotation relative to the first stator. For example, the electric drive unit has a housing, wherein the first rotor can be rotated around the first engine axis of rotation relative to the housing. The electric drive unit additionally has a second electric engine, which has a second rotor. In particular, the second electric engine also has a second stator. For example, the second rotor can be driven by means of the second stator and can thus be rotated around a second engine axis of rotation relative to the second stator, and preferably also relative to the housing. It is conceivable that the electric engines are arranged coaxially with each other, such that the engine axes of rotation coincide. It is further conceivable that the electric engines are arranged axially in parallel with each other, such that for example the engine axes of rotation are spaced apart from each other and run in parallel with each other.

The first electric engine can provide first drive torques via its first rotor, in particular to drive the vehicle wheels. The second electric engine can provide second drive torques via its second rotor, in particular to drive the vehicle wheels. The electric drive unit also has a transmission unit, which has and thus comprises a differential transmission. In particular, the differential transmission is at least partially arranged in the housing. The differential transmission has exactly three first shafts arranged coaxially with one another, specifically a sum shaft, a first differential shaft, and a second differential shaft. This means that the first shafts can be rotated relative to the housing around a first shaft axis of rotation shared by the first shafts. In particular, the differential transmission is an epicyclic transmission, and is thus for example designed as an epicyclic transmission differential. Most particularly, the differential transmission is preferably designed as a planetary transmission, and thus as a planetary transmission differential, which is also described as a planetary differential. The differential transmission is also described as a differential. The differential transmission can also be a bevel gear differential, which is also described as a bevel differential. Particularly if the differential transmission is designed as a bevel differential, for example a first of the first shafts is a differential cage, also described as a differential basket, which is designed so to speak as a hollow shaft or in the manner of a hollow shaft, a second of the first shafts is a first side shaft and the third of the first shafts is a second side shaft. The first rotor is connected to the sum shaft, i.e., is coupled or connected to the sum shaft, in particular in a torque-transmitting manner, such that torques provided by the first rotor can be introduced into the transmission unit via the sum shaft. In other words, torques originating from the first rotor can be introduced into the transmission unit at or via the sum shaft. The respective torque that is or can be provided by the first rotor is, for example, the respective first drive torque. For example, the first rotor is connected to the sum shaft, in particular permanently, in a torque-transmitting manner, in particular in a manner fixed against rotation. The sum shaft is thus, for example, a first drive, also described as a first input, of the differential transmission, in particular of the transmission unit, because the respective first drive torque can be introduced into the differential transmission, and thus into the transmission unit, via the sum shaft.

The first differential shaft is coupled or connected, in particular in a torque-transmitting manner, to a first of the vehicle wheels such that torques, also described as first output torques, can be discharged from the transmission unit and transmitted to the first vehicle wheel via the first differential shaft, in particular in order to thereby drive the first vehicle wheel. The first differential shaft is thus, for example, a first output drive, described as a first output, of the differential transmission, and in particular of the transmission unit as a whole, because the respective first output torques can be discharged from the transmission unit and transmitted to or onto the first vehicle wheel via the first differential shaft, in particular in order to thereby drive the first vehicle wheel. In other words, the first differential shaft is coupled, in particular permanently, to the first vehicle wheel, in particular in a torque-transmitting manner, such that the first output torques originating from the transmission unit can be discharged at the first differential shaft from the transmission unit to the first vehicle wheel. For example, the first differential shaft is coupled, i.e., connected, to the first vehicle wheel, in particular permanently, in a torque-transmitting manner, in particular in a manner fixed against rotation.

The second differential shaft is coupled, in particular in a torque-transmitting manner, to a second of the vehicle wheels such that torques also described as output torques can be discharged from the transmission unit and transmitted to the second vehicle wheel via the second differential shaft, in particular in order to thereby drive the second vehicle wheel. In particular, the first vehicle wheel and the second vehicle wheel are vehicle wheels of the same vehicle axle, in particular of the previously specified one vehicle axle. The second differential shaft is thus, for example, a second output drive, also described as a second output, of the differential transmission, and in particular of the transmission unit as a whole, because the second output torques can be discharged from the transmission unit and transmitted to or onto the second vehicle wheel via the second differential shaft. In other words, the second output torques originating from the transmission unit can be discharged from the transmission unit at the second differential shaft to the second vehicle wheel. For example, the second differential shaft is coupled, i.e., connected, to the second vehicle wheel, in particular permanently, in a torque-transmitting manner, in particular in a manner fixed against rotation.

The transmission unit additionally has a superimposed planetary gear set, which is, in particular, provided in addition to the differential transmission. If, for example, the differential transmission is a first planetary transmission or the previously specified planetary transmission, then the superimposed planetary gear set is for example a second planetary transmission. The superimposed planetary gear set is also simply described as a planetary gear set or planetary set, and has, in particular exactly, three further shafts, specifically a sun gear, a planetary carrier also described as a link and a ring gear. The sun gear, the planetary carrier, and the ring gear are transmission elements of the superimposed planetary gear set. In particular, if the respective transmission element is not connected to the housing in a manner fixed against rotation, the respective transmission element can be rotated around a planetary gear set axis of rotation of the superimposed planetary gear set. It is preferably provided that the transmission elements are arranged coaxially with one another. In particular, it is conceivable that the differential transmission is arranged coaxially with the superimposed planetary gear set such that the planetary gear set axis of rotation coincides with the shaft axis of rotation. The ring gear is or can be connected to the first differential shaft in a manner fixed against rotation. In addition, the second rotor is coupled to the sun gear, in particular in a torque-transmitting manner, such that torques provided by the second rotor can be introduced into the transmission unit via the sun gear. The respective torque that is or can be provided by the second rotor is, for example, the respective second drive torque. The sun gear is thus, for example, a second drive, also described as a second input, of the transmission unit, because the respective second drive torque can be introduced into the transmission unit via the sun gear. In other words, the second rotor is coupled to the sun gear, in particular in a torque-transmitting manner, such that torques originating from the second rotor can be introduced into the transmission unit at the sun gear. For example, the second rotor is coupled, i.e., connected, to the sun gear, in particular permanently, in a torque-transmitting manner. It is conceivable that the first electric engine is arranged coaxially with the differential transmission and/or coaxially with the planetary gear set, such that the first engine axis of rotation coincides with the shaft axis of rotation and/or with the planetary gear set axis of rotation. It is further conceivable that the second electric engine is arranged axially in parallel with the differential transmission and/or with the planetary gear set, such that the second engine axis of rotation runs in parallel with the shaft axis of rotation and/or in parallel with the planetary gear set axis of rotation and is spaced apart from the shaft axis of rotation and/or from the planetary gear set axis of rotation.

The ring gear is or can be connected to the first differential shaft in a manner fixed against rotation. In other words, in one variant, it is conceivable that the first differential shaft is connected to the ring gear, in particular permanently, in a manner fixed against rotation. In a second variant, it is conceivable that the first differential shaft can be connected to the ring gear in a manner fixed against rotation.

In the context of the present invention, the feature that two components, e.g., the first differential shaft and the ring gear, are connected to each other in a manner fixed against rotation, should be understood to mean that the components that are connected to each other in a manner fixed against rotation are arranged coaxially with each other, and, in particular if the components are driven, rotate together or simultaneously around a component axis of rotation shared by the components, e.g., the planetary gear set axis of rotation, at the same angular velocity, in particular relative to the housing. In other words, a connection in a manner fixed against rotation of two, in particular, rotatably mounted elements should be understood to mean that the two elements are arranged coaxially with each other and are connected to each other such that they rotate at the same angular velocity. A connection in a manner fixed against rotation of a rotatably mounted element to the housing should be understood to mean that the element is connected to the housing such that the element cannot be pivoted relative to the housing.

The feature that two components, e.g., the sun gear and the second rotor, are coupled or connected to each other in a torque-transmitting manner, should be understood to mean that the components are coupled or connected to each other such that torques can be transmitted between the components, wherein if the components are connected to each other in a manner fixed against rotation, the components are also connected to each other in a torque-transmitting manner.

The feature that two components are permanently connected to each other in a torque-transmitting manner should be understood to mean that no switching element is provided that can be switched between a coupled state connecting the components to each other in a torque-transmitting manner and a decoupled state, in which no torques can be transmitted between the components, and instead the components are continuously or always, and thus permanently connected to each other in a torque-transmitting manner, i.e., such that a torque can be transmitted between the components. Thus, for example, one of the components can be driven by the other respective component or vice versa. In particular, the feature that the components are permanently connected to each other in a torque-transmitting manner should be understood to mean that a switching element is not provided that can be switched between a coupled state connecting the components to each other in a manner fixed against rotation and a decoupled state, in which the components can be decoupled from each other and be rotated relative to each other, in particular around the component axis of rotation, such that, for example, no torques can be transmitted between the components, and instead the components are continuously or always, and thus permanently connected or coupled to each other. Furthermore, the feature that two components can be coupled or connected to each other in a torque-transmitting manner, in particular in a manner fixed against rotation, should be understood to mean that a switch element is assigned to the components, the switch element being able to be switched between a coupled state, in which the components can be connected to each other in a torque-transmitting manner, in particular in a manner fixed against rotation, by means of the switch element, and a decoupled state, in which the components are decoupled from each other, such that the components can rotate relative to each other, in particular also around the component axis of rotation, and such that in particular no torques can be transmitted between the components.

It is provided according to the invention that the planetary carrier is connected to the sum shaft in a manner fixed against rotation, in particular permanently, so that a particularly advantageous torque distribution, also described as torque vectoring or as a torque vectoring function, can be implemented.

The respective, previously specified, first output torque, for example, results from the respective first drive torque optionally introduced into the transmission unit and/or from the respective second drive torque optionally introduced into the transmission unit. For example, the respective second output torque results from the respective first drive torque optionally introduced into the transmission unit and/or from the respective second drive torque optionally introduced into the transmission unit.

Via the invention, particularly high torques can be implemented without losing drive power, in particular in the case of torque distribution, and thus in the case of torque vectoring, such that a particularly high yaw moment acting around the vertical direction of the vehicle can be implemented. The invention further makes a particularly efficient journey possible with only one of the electric engines. In other words, via the invention, particularly efficient single-engine operation can be implemented, in which, with regard to the electric engines, the vehicle wheels are exclusively driven by means of one of the electric engines, in particular exclusively by means of the first electric engine. In addition, it is possible to use the second electric engine as a torque distribution engine, and in particular as a support motor in boost mode also described as support mode, and to detach it, i.e. uncouple it, from the transmission unit, in particular in the single-engine operation. It is in particular conceivable that in support mode also simply described as boost, the vehicle wheels are driven, in particular simultaneously, by means of both electric engines, in order thus, for example, to accelerate the motor vehicle particularly significantly. For example, in boost mode, or to implement boost mode, the second electric engine, in particular the second rotor, is connected, in particular geared, to the transmission unit, and in the process in particular to the differential transmission, for example via the planetary gear set, whereby a particularly high output drive torque as a whole can be generated.

Torque distribution (torque vectoring) should in particular be understood to mean the following: for example, the differential transmission has a basic distribution, according to which, for example, a total torque introduced into the transmission unit, in particular via the sum shaft, is shared or distributed to the output drives, i.e., to the differential shafts, and via the latter to the vehicle wheels. In particular, the basic distribution is defined, i.e., fixed by a mechanical construction or design of the differential transmission. The total torque results, for example, from the respective first drive torque and/or from the respective second drive torque, wherein the total torque can, for example, in particular result from the respective first drive torque and from the respective second drive torque, if both the respective first drive torque and the respective second drive torque are introduced into the transmission unit, in particular simultaneously. Because the respective second drive torque can be introduced via the sun gear into the superimposed planetary gear set, and via the latter into the transmission unit as a whole, the differential transmission can be influenced, in particular via the superimposed planetary gear set by means of the second rotor, and thus by means of the second electric engine, in such a way that, for example, the respective first drive torque or total torque introduced into the differential transmission or into the transmission unit via the sum shaft is shared or distributed to the output drives, and thus to the differential shafts, and via the latter to the vehicle wheels not or not only according to the basic distribution, but according to a distribution differing from the basic distribution, wherein, in particular by varying the respective second drive torque or by varying a magnitude of the respective second drive torque, i.e., in particular by providing the different second drive torques, the specified distribution can be varied. For example, it is thus possible to set the first output torque to have a first value, in particular a first magnitude, and to set the second output torque, in particular simultaneously, to have a second value differing from the first value, in particular a second magnitude differing from the first magnitude. This torque distribution is, in particular, advantageous when the motor vehicle is driving around a bend, because a greater torque can then, for example, be assigned to the vehicle wheel on the outside of the bend than to the vehicle wheel on the inside of the bend, for example in order to accelerate the motor vehicle out of a bend. Particularly advantageous driving dynamics can thus be implemented. In addition, the differential transmission has the function already sufficiently known from the prior art that the differential transmission permits different rotational speeds of the vehicle wheels when the motor vehicle is driving around a bend, in particular such that the vehicle wheel on the outside of the bend rotates at a greater rotational speed than the vehicle wheel on the inside of the bend, in particular while the vehicle wheels are being driven or can be driven by means of the first rotor and/or by means of the second rotor, that is to say by means of the first electric engine and/or the second electric engine. In particular, compared with conventional solutions, the invention enables higher torques during torque vectoring, in particular without losing drive power, such that a particularly strong yaw moment acting around the vertical direction of the vehicle can be implemented on the vehicle.

A particularly advantageous support mode, also described as a boost or boost mode, can further be implemented via the invention. For this purpose, the differential shafts and the vehicle wheels of both electric engines are driven, in particularly simultaneously.

It is provided in a further embodiment of the invention that the electric drive unit has a first switch unit so that a particularly advantageous switchability, and thus a particularly advantageous torque distribution can be implemented. In one embodiment, the first switch unit is designed to connect the ring gear to the first differential shaft in a manner fixed against rotation. In other words, the ring gear can, for example, be connected to the differential shaft in a manner fixed against rotation by means of the first switch unit. In a further embodiment, the first switch unit is designed to connect the ring gear to the second differential shaft in a manner fixed against rotation. For example, the first switch unit can be switched between a first coupled state and a first decoupled state. In the first coupled state, the ring gear is connected to the first differential shaft in a manner fixed against rotation or to the second differential shaft in a manner fixed against rotation by means of the first switch unit. In the first decoupled state, the first switch unit in particular permits relative rotations implemented around the planetary gear set axis of rotation between the ring gear and the first or second differential shaft.

A further, particularly advantageous embodiment is characterized by a second switch unit, which is designed to connect the ring gear to the housing of the electric drive unit in a manner fixed against rotation. For example, the second switch unit can be switched between a second coupled state and a second decoupled state. In the second coupled state, the ring gear is connected to the housing in a manner fixed against rotation by means of the second switch unit. In the second decoupled state, the second switch unit, in particular, permits relative rotations implemented around the planetary gear set axis of rotation between the ring gear and the housing. The first coupled state is for example associated with the second decoupled state. Preferably, the second coupled state is for example associated with the first decoupled state.

The switch unit should, in particular, be understood to mean a switch device for connecting two elements in a manner fixed against rotation, for example two shafts or a shaft and the housing, wherein for example the switch device has a first switch half connected to a first of the elements in a manner fixed against rotation and a second switch surface connected to a second of the elements in a manner fixed against rotation. For example, the two switch halves have claws, in particular if the switch unit is designed as a claw coupling. Thus, for example, the switch unit is designed as a form-fit switch unit, by means of which the elements can be connected to each other in a form-fit manner fixed against rotation. It is further conceivable that the two switch halves have discs, in particular if the switch unit is designed as a disc coupling. Thus, the switch unit can be a force-or friction-fit switch unit, by means of which the first element and the second element can be connected to each other in a friction-or force-fit manner. The term "switch unit" does not include a hydraulic, mechanical, or electro-mechanical operating device for the switch unit. Switching particularly suited to requirements can be implemented via the switch units, such that a particularly advantageous torque distribution can be achieved.

In a further embodiment of the invention, it is provided that the first switch unit is coupled to the second switch unit in such a way that the two switch units can be switched by means of a single actuator so that a particularly advantageous torque distribution can be implemented in a particularly installation space-, weight-and cost-efficient manner. Thus, for example, the switch units are combined or merged to form a total switch unit, which can be switched by means of the one single actuator. In particular, a sliding sleeve of the respective switch unit can, for example, be moved, in particular translationally and/or in the axial direction of the transmission unit and/or relative to the housing, between a respective coupled position causing the respective coupled state and a respective decoupled position causing the respective decoupled state. In particular, the axial direction of the transmission unit should be understood to mean that the axial direction coincides with the shaft axis of rotation and/or planetary gear set axis of rotation, and thus runs in parallel with the planetary gear set axis of rotation and with the shaft axis of rotation.

In a further embodiment of the invention, it is provided that the first switch unit and the second switch unit are arranged axially overlapping and radially within the first rotor, such that the switch units are respectively surrounded at least partially, in particular at least substantially and thus at least more than half or completely by the first rotor outwards in the radial direction of the first electric engine, so that a particularly advantageous torque distribution can be implemented in a particularly installation space-efficient manner. In other words, it is for example provided that the first rotor surrounds at least one respective longitudinal region of the switch units, in particular completely continuously, in the peripheral direction of the first electric engine running around the first engine axis of rotation.

The term axial overlap of two elements thus means that the two elements in question are respectively at least partially arranged in a same axial region. By the axial region, an interval on a coordinate axis is meant, which runs along the axial direction, wherein the axial region can have any coordinates in the two other spatial directions.

It has proved particularly advantageous if the first switch element is designed to connect the ring gear to the first differential shaft in a manner fixed against rotation.

In a further, particularly advantageous embodiment of the invention, the first switch unit is designed to connect the ring gear to the second differential shaft in a manner fixed against rotation. In the axial direction of the superimposed planetary gear set, and thus when viewed along the planetary gear set axis of rotation, the differential transmission, the superimposed planetary gear set, the second switch unit, and the first switch unit are arranged one after the other in the specified sequence, i.e., in the following sequence: the differential transmission—the superimposed planetary gear set—the second switch unit—the first switch unit. In other words, when viewed in the axial direction of the superimposed planetary gear set, the superimposed planetary gear set is arranged after or behind the differential transmission so that the superimposed planetary gear set follows the differential transmission, wherein, in the axial direction of the planetary gear set, the second switch unit follows the superimposed planetary gear set, and the first switch unit follows the second switch unit. An overall length of the drive unit running in the axial direction of the superimposed planetary gear set, and thus for example of the transmission unit can thus in particular be kept particularly short.

In a further embodiment of the invention, it is provided that the differential transmission is arranged coaxially with the first rotor, axially overlapping the first rotor and radially within the first rotor so that a particularly advantageous torque distribution can be implemented in a particularly installation space-efficient manner. It is thus preferably provided that the first rotor surrounds at least one longitudinal region of the differential transmission, in particular of the total differential transmission, in particular completely continuously, in the peripheral direction of the first electric engine running around the first engine axis of rotation. It is thus preferably provided that the differential transmission and the first rotor are nestled inside each other.

In a further embodiment of the invention, it is provided that the superimposed planetary gear set is arranged coaxially with the first rotor, axially overlapping the first rotor and radially within the first rotor so that the first rotor preferably surrounds at least one longitudinal region of the superimposed planetary gear set, in particular the total superimposed planetary gear set, in particular completely continuously, in the peripheral direction of the first electric engine, so that the required installation space can be kept particularly low. It is thus preferably provided to nestle or stack the superimposed planetary gear set and the first rotor inside each other, whereby the axial length of the drive unit can in particular be kept particularly low.

It is provided in a further embodiment of the invention that the transmission unit has a first transmission stage and a second transmission stage, so that a particularly advantageous transmission ratio and thus torque distribution can be implemented. In relation to a first torque flow running from the first differential shaft to the first vehicle wheel, via which for example the respective first output torque can be transmitted from the first differential shaft on or onto the first vehicle wheel, the first transmission stage is arranged between the first differential shaft and in the first vehicle wheel, and thus downstream of the differential shaft and upstream of the first vehicle wheel. In relation to a second torque flow running from the second differential shaft to the second vehicle wheel, along which for example the respective second output torque can be transmitted from the second differential shaft onto or on the second vehicle wheel, the second transmission stage is arranged between the second differential shaft and the second vehicle wheel, and thus downstream of the second differential shaft and upstream of the second vehicle wheel.

It has finally proved particularly advantageous if the differential transmission is designed as a bevel gear differential, wherein, when viewed in the axial direction of the first rotor, and thus along the first engine axis of rotation, the first rotor, the differential transmission, the superimposed planetary gear set, and the second rotor are arranged one after the other in the specified order, i.e., in the following order: the first rotor-the differential transmission-the superimposed planetary gear set-the second rotor. In other words, in the axial direction of the first electric engine, and thus when viewed along the first engine axis of rotation, the differential transmission follows the first rotor, the superimposed planetary gear set follows the differential transmission and the second rotor follows the superimposed planetary gear set.

Further advantages, features and details of the invention result from the following description of preferred exemplary embodiments and with reference to the drawing. The features and combinations of features specified previously in the description and the features and combinations of features specified in the following description of figures and/or shown in the figures alone can be used not only in the respectively specified combination, but also in other combinations or in isolation, without leaving the scope of the invention.

BRIEF DESCRIPTION OF THE DRAWING FIGURES

In the drawing.

Identical or functionally identical elements are provided with the same reference signs in the figures.

DETAILED DESCRIPTION

Figure 1:
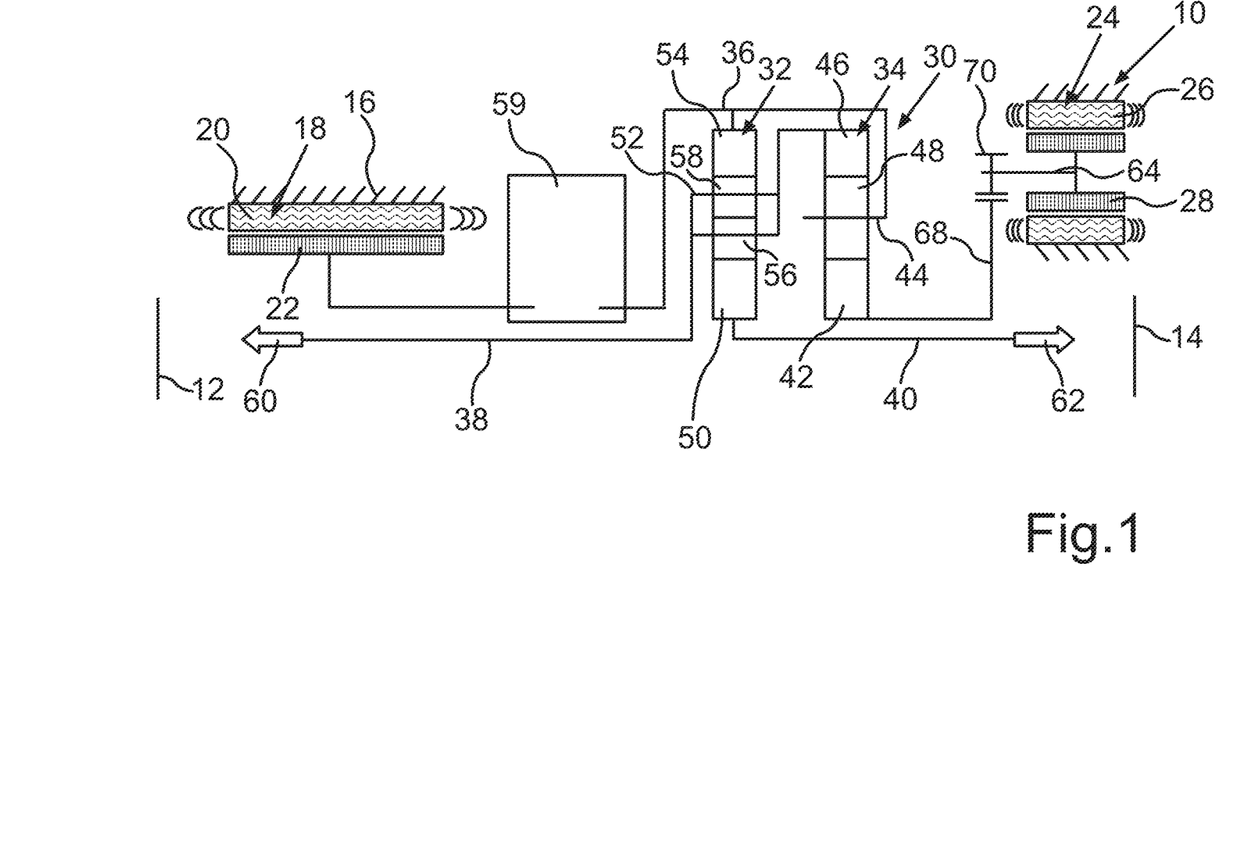
FIG. 1 shows a schematic depiction of a first embodiment of an electric drive unit for a motor vehicle, in particular for a motor car.

FIG. 1 shows, in a schematic depiction, a first embodiment of an electric drive unit 10 for a motor vehicle, in particular for a motor car. The electric drive unit 10 is assigned to a vehicle axle—also simply described as an axle—of the motor vehicle also described as a vehicle, wherein the vehicle axle has at least or exactly two vehicle wheels 12 and 14 that are depicted particularly schematically in FIG. 1. The vehicle wheels 12 and 14 also simply described as wheels can be a component part of the drive unit 10. The vehicle wheels 12 and 14 are for example arranged on opposite sides of the motor vehicle in the transverse direction of the vehicle.

The electric drive unit 10 has a housing 16, depicted particularly schematically in FIG. 1, and a first electric engine 18, which is also described as a drive engine or is designed as a drive engine. The first electric engine 18 has a first stator 20 that is connected to the housing 16, in particular in a manner fixed against rotation, and a first rotor 22. The rotor 22 can be driven by means of the stator 20, and can thus be rotated around a first engine axis of rotation relative to the stator 20 and relative to the housing 16. Via its rotor 22, the electric engine 18 can provide first drive torques, in particular to drive the vehicle wheels 12 and 14. The drive unit 10 has a second electric engine 24, which has a second stator 26 and a second rotor 28. The second rotor 28 can be driven by means of the second stator 26, and can thus be rotated around a second engine axis of rotation relative to the stator and relative to the housing 16. In particular, the stator is connected to the housing 16, in particular in a manner fixed against rotation. In the first embodiment, the electric engines 18 and 24 are arranged axially offset from each other. This means that the engine axes of rotation run in parallel with each other and are spaced apart from each other. Via its rotor 28, the second electric engine 24 can provide second drive torques, in particular to drive the vehicle wheels 12 and 14.

The electric drive unit 10 has a transmission unit 30, also simply described as a transmission, which has a differential transmission 32 also simply described as a differential and a superimposed planetary gear set 34. The superimposed planetary gear set 34 is also simply described as a planetary gear set. The differential transmission 32 (differential) has exactly three first shafts arranged coaxially with one another, specifically a sum shaft 36, a first differential shaft 38, and a second differential shaft 40. The first shafts can be rotated relative to the housing 16 around a shaft axis of rotation shared by the first shafts. The electric engine 18 is arranged coaxially with the differential transmission 32, and also coaxially with the planetary gear set (superimposed planetary gear set 34), such that the shaft axis of rotation coincides with the first engine axis of rotation. In the first embodiment, the differential is designed as a first planetary transmission, and thus as a planetary differential. The planetary gear set (superimposed planetary gear set 34) is thus a second planetary transmission. The planetary gear set has in particular exactly three further shafts, specifically a first sun gear 42, a first planetary carrier 44 and a first ring gear 46. The sun gear 42, the planetary carrier 44 also described as a link, and the ring gear 46 can be rotated around a planetary gear set axis of rotation of the planetary gear set relative to the housing 16. The planetary gear set is arranged coaxially with the differential transmission 32, such that the shaft axis of rotation coincides with the planetary gear set axis of rotation. In addition, the planetary gear set axis of rotation coincides with the first engine axis of rotation, and the shaft axis of rotation also coincides with the first engine axis of rotation, such that the first electric engine 18 is arranged coaxially with the differential transmission 32 and coaxially with the superimposed planetary gear set 34. In the first exemplary embodiment, the superimposed planetary gear set 34 is designed as a simple planetary gear set. The planetary gear set thus has first planetary gears 48, which are rotatably mounted on the planetary carrier 44. The respective first planetary gear 48 interlocks simultaneously with the sun gear 42 and with the ring gear 46.

In the first embodiment, the differential transmission 32 has a second sun gear 50, a second planetary carrier 52, and a second ring gear 54. In the first embodiment, the planetary differential is designed as a double planetary gear set, such that the planetary carrier 52 is designed as a double planetary carrier.

The differential transmission 32 has first planetary gears 56 and second planetary gears 58. The planetary gears 56 and the planetary gears 58 are rotatably mounted on the planetary carrier 52. The respective planetary gear 56 interlocks with the sun gear 50 but not with the ring gear 54. The respective planetary gear 58 interlocks with the ring gear 54 but not with the sun gear 50. In addition, one of the planetary gears 56 respectively and one of the planetary gears 58 respectively form a respective planetary gear pair, wherein the planetary gears 56 and 58 of the respective planetary gear pair interlock with each other. The first rotor 22 is connected to the sum shaft 36 in such a way that the respective first drive torque that is or can be provided by the first rotor 22 can be introduced into the transmission unit 30 via the sum shaft 36. In particular, the rotor 22 is presently coupled, in particular permanently, to the sum shaft 36 in a manner fixed against rotation. It is further conceivable that the rotor 22 can be coupled, i.e., can be connected, to the sum shaft 36, in particular in a torque-transmitting manner.

In the first embodiment, a particularly schematically depicted multi-gear unit 59 is provided, via which the rotor 22 is or can be coupled to the sum shaft 36, in particular in a torque-transmitting manner. The multi-gear unit 59, for example, has several switchable gears, in particular having respective transmission ratios that differ from each other. The respective first drive torque can thus for example be transmitted from the first rotor 22 to or onto the sum shaft 36 via the multi-gear unit 59, and can subsequently be introduced into the transmission unit 30 via the sum shaft 36.

In the first embodiment, the second rotor 28 is coupled to the sun gear 42, in particular in a torque-transmitting manner, in such a way that the respective second drive torque that can be or is provided by the second rotor 28 can be introduced into the transmission unit 30 via the sun gear 42. In the first embodiment, the second rotor 28 is permanently coupled to the sun gear 42 in a torque-transmitting manner.

The first differential shaft 38 is coupled to the first vehicle wheel 12, in particular in a torque-transmitting manner, such that torques depicted by an arrow 60 and also described as first output torques can be discharged from the transmission unit 30 via the first differential shaft 38, and can be transmitted to the vehicle wheel 12. The second differential shaft 40 is coupled to the second vehicle wheel 14, in particular in a torque-transmitting manner, such that torques depicted by an arrow 62 and also described as second output torques can be discharged from the transmission unit 30 via the second differential shaft 40, and can be transmitted to the second vehicle wheel 14. In the first embodiment, the differential shaft 38 is connected, in particular permanently, to the planetary carrier 52 in a torque-transmitting manner, in particular in a manner fixed against rotation. In the first embodiment, the ring gear 46 is connected, in particular permanently, to the planetary carrier 52 in a manner fixed against rotation, and is thus connected, in particular permanently, to the differential shaft 38 in a manner fixed against rotation. The sun gear 50 is connected, in particular permanently, to the differential shaft 40 in a manner fixed against rotation. The ring gear 54 is connected, in particular permanently, to the sum shaft 36 in a manner fixed against rotation. In addition, the planetary carrier 44 is connected, in particular permanently, to the sum shaft 36 in a manner fixed against rotation. A particularly advantageous torque distribution can thus be implemented.

In the first embodiment, the second rotor 28 has a rotor shaft 64, which is connected, in particular permanently, to a first gearwheel 66 in a manner fixed against rotation. The sun gear 42 is connected, in particular permanently, to a second gearwheel 68 in a manner fixed against rotation, said gearwheel 68 interlocking with the gearwheel 66. The second rotor 28 is thus coupled, in particular permanently, with the sun gear 42 in a torque-transmitting manner via the gearwheels 66 and 68.

Figure 2:
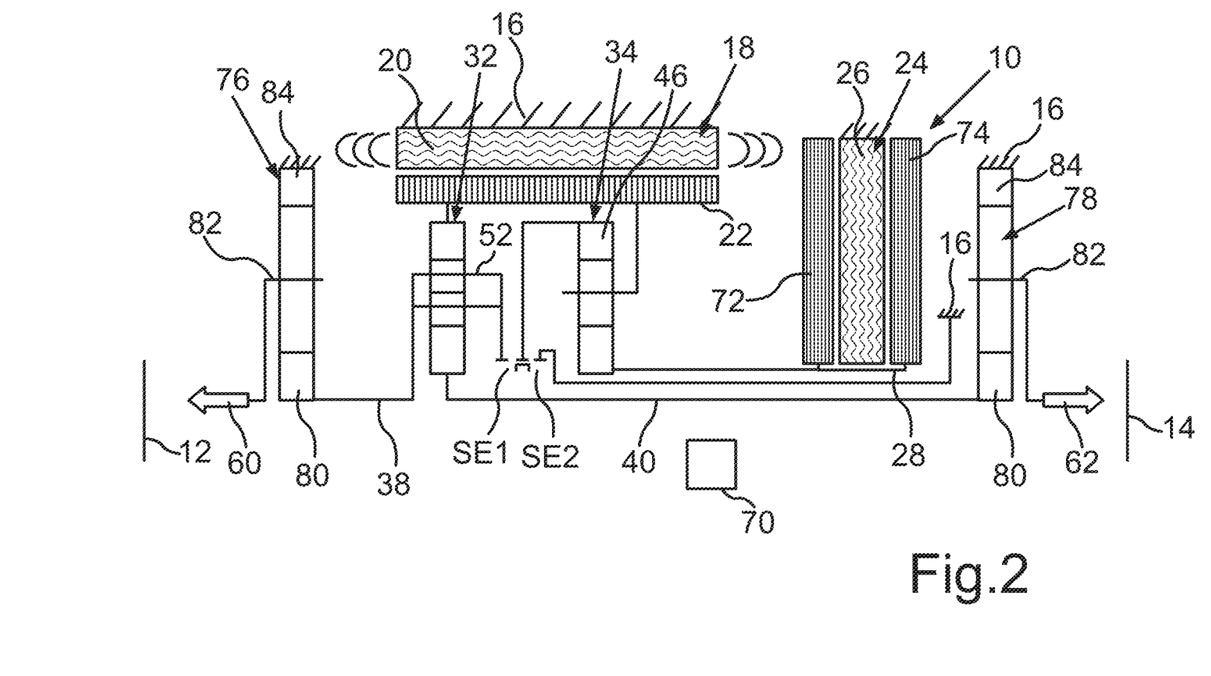
FIG. 2 shows a schematic depiction of a second embodiment of the electric drive unit.

FIG. 2 shows a second embodiment. In the second embodiment, the drive unit 10 has a first switch unit SE1 by means of which, in the second embodiment, the ring gear 46 can be connected to the first differential shaft 38 in a manner fixed against rotation. In the second embodiment, the ring gear 46 can be connected to the planetary carrier 52, and via the latter to the differential shaft 38, in a manner fixed against rotation by means of the first switch unit SE1. In addition, a second switch unit SE2 is provided, by means of which the ring gear 46 can be connected to the housing 16 in a manner fixed against rotation. The switch units SE1 and SE2 are coupled to each other such that the switch units SE1 and SE2 can be switched by means of a single actuator 70 shared by the switch units SE1 and SE2 and depicted particularly schematically in FIG. 1. In particular, a shared sliding sleeve of the switch units SE1 and SE2 can for example be moved, in particular translationally, relative to the housing 16 in the axial direction of the transmission unit 30 by means of the actuator 70. The first switch unit SE1 can thus be switched between a first decoupled state and a first coupled state, and can, in particular, be moved between a first coupled position causing the first coupled state and a first decoupled position causing the first decoupled state. The second switch unit SE2 can be switched between a second coupled state and a second decoupled state, and can, in particular, be moved between a second coupled position causing the second coupled state and a second decoupled position causing the second decoupled state. In the first coupled state, the ring gear 46 can be connected to the planetary carrier 52, and thus to the differential shaft 38, in a manner fixed against rotation by means of the first switch unit SE1. In the first decoupled state, the ring gear 46 and the differential shaft 38 can be rotated relative to each other around the planetary gear set axis of rotation or around the shaft axis of rotation. In the second coupled state, the ring gear 46 is connected to the housing 16 in a manner fixed against rotation by means of the second switch unit SE2. In the second decoupled state, the ring gear 46 can be rotated around the planetary gear set axis of rotation relative to the housing 16. The second switch unit SE2 is in its second decoupled state if the first switch unit is in its first coupled state. In addition, the first switch unit SE1 is in its first decoupled state if the second switch unit SE2 is in its second coupled state. In other words, the second decoupled state is associated with the first coupled state, and the first decoupled state is associated with the second coupled state. The second decoupled position is thus associated with the first coupled position, and the first decoupled position is associated with the second coupled position.

In the second embodiment, the switch units SE1 and SE2 are arranged axially overlapping the first rotor 22 and radially within the first rotor 22. In addition, both the differential transmission 32 and the superimposed planetary gear set 34 are arranged, in particular completely, coaxially with the first rotor 22, axially overlapping the first rotor 22 and radially within the first rotor 22.

The first electric engine 18 is, for example, an internal rotor machine, such that for example the stator 20 surrounds at least one longitudinal region of the rotor 22 completely continuously in the peripheral direction of the first electric engine 18 running around the first engine axis of rotation. In the first embodiment, the second electric engine 24 is designed as an internal rotor machine. In the second embodiment, the second electric engine 24 is designed as an axial flux machine, of which the second rotor 28 comprises at least or exactly two rotor parts 72 and 74. The rotor parts 72 and 74 are, for example, at least substantially discoidal, meaning that the axial flux machine is also described as a disc rotor or disc rotor engine. The rotor parts 72 and 74 are spaced apart from one another when viewed in the axial direction of the second electric engine 24, and thus along the second engine axis of rotation, wherein the stator 26 is arranged at least partially between the rotor parts 72 and 74 in the axial direction of the electric engine 24. The rotor parts 72 and 74 are connected to each other, in particular permanently, in a manner fixed against rotation. In the second embodiment, the electric engine 24 is arranged coaxially with the electric engine 18, coaxially with the differential transmission 32 and coaxially with the planetary gear set.

In the second embodiment, the drive unit 10 comprises a first transmission stage 76 and a second transmission stage 78. In relation to a first torque flow, via which the respective first output torque can be transmitted from the differential shaft 38 to the vehicle wheel 12, and thus the vehicle wheel 12 can be driven by the differential shaft 38, the transmission stage 76 is arranged between the differential shaft 38 and the vehicle wheel 12. In relation to a second torque flow, via which the respective second output torque can be transmitted from the differential shaft 40 to the vehicle wheel 14, and thus the vehicle wheel 14 can be driven by the differential shaft 40, the transmission stage 78 is arranged between the differential shaft 40 and the vehicle wheel 14. For example, the respective transmission stage 76, 78 is designed as a respective further planetary gear set, which has a respective further sun gear 80, a respective further planetary carrier 82 and a respective further ring gear 84. For example, the ring gear 84 is connected, in particular permanently, to the housing 16 in a manner fixed against rotation. For example, the respective sun gear 80 is connected, in particular permanently, to the respective differential shaft 38, 40 in a manner fixed against rotation. In addition, for example, the respective planetary carrier 82 can be or is coupled, i.e., can be or is connected, in particular permanently, to the respective vehicle wheel 12, 14 in a torque-transmitting manner.

Figure 3:
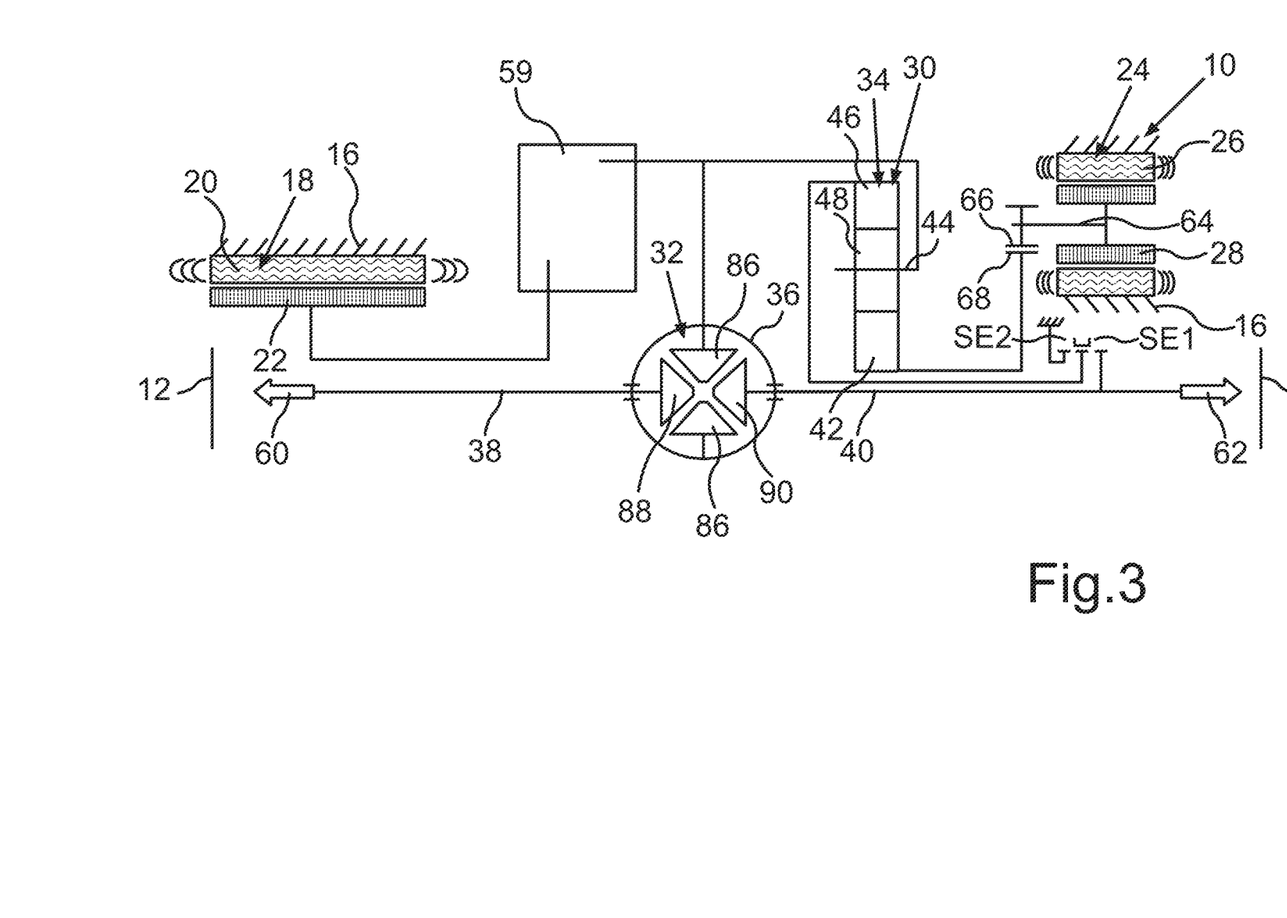
FIG. 3 shows a schematic depiction of a third embodiment of the electric drive unit.

Finally, FIG. 3 shows a third embodiment of the drive unit 10. In the third embodiment, the differential transmission 32 is designed as a bevel gear differential. The sum shaft 36 is an input element of the differential transmission 32 designed as a differential cage, wherein the differential cage is also described as a differential basket. The sum shaft 36 can be rotated around the shaft axis of rotation relative to the housing 16. The differential transmission 32 has compensating gearwheels 86, which are presently designed as bevel gears. The compensating gearwheels 86 also simply described as compensating gears are arranged coaxially with each other, and can be rotated relative to the sum shaft 36 (differential cage) around a compensating gear axis of rotation shared by the compensating gears, wherein the compensating gear axis of rotation runs perpendicular to the shaft axis of rotation. For example, the compensating gears are mounted on the differential cage via a respective bolt or via a bolt shared by the compensating gears so as to rotate around the compensating gear axis of rotation relative to the sum shaft 36. The bevel gear differential also has output drive gearwheels 88 and 90, which are also described as output drive gears. The output drive gears do not interlock with each other, the respective output drive gear interlocking, in particular simultaneously, with the compensating gears. The output drive gearwheel 88 is, in particular permanently, connected to the first differential shaft 38 in a manner fixed against rotation, and the output drive gearwheel 90 is, in particular permanently, connected to the differential shaft 40 in a manner fixed against rotation. The output drive gears are presently bevel gears. In particular, the output drive gears can be rotated around the shaft axis of rotation relative to each other, and in particular, the respective output drive gearwheel 88, 90 can be rotated around the shaft axis of rotation relative to the differential cage (sum shaft 36). In the third embodiment, the switch unit SE1 is designed to connect the ring gear 46 to the second differential shaft 40 in a manner fixed against rotation. The second switch unit SE2 is designed to connect the ring gear 46 to the housing 16 in a manner fixed against rotation.

As in the first embodiment, in the third embodiment, the multi-gear unit 59 is also provided, which is optionally provided both in the first embodiment and in the third embodiment, and can thus be dispensed with.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the inven-

The invention claimed is:

1. An electric drive unit for a motor vehicle, the electric drive unit comprising:
    a first electric engine having a first rotor;
    a second electric engine having a second rotor;
    a transmission unit comprising
        a differential transmission having exactly three first shafts arranged coaxially with one another, wherein the exactly three first shafts are
            a sum shaft, to which the first rotor is connected such that torques provided by the first rotor are introducible into the transmission unit via the sum shaft;
            a first differential shaft coupled to a first vehicle wheel such that torques are dischargeable from the transmission unit and transmitted to the first vehicle wheel via the first differential shaft; and
            a second differential shaft coupled to a second vehicle wheel such that torques are dischargeable from the transmission unit and transmitted to the second vehicle wheel via the second differential shaft; and
        a superimposed planetary gear set comprising three further shafts, wherein the three further shafts comprise
            a sun gear, to which the second rotor is coupled such that torques provided by the second rotor are introducible into the transmission unit via the sun gear; and
            a planetary carrier; and
            a ring gear connected or connectable to the first differential shaft or the second differential shaft in a manner fixed against rotation,
        wherein the superimposed planetary carrier is connected to the sum shaft in a manner fixed against rotation, and
        wherein the differential transmission is arranged coaxially with the first rotor, axially overlapping the first rotor and radially within the first rotor,
        wherein the transmission unit further comprises
            a first transmission stage arranged between the first differential shaft and the first vehicle wheel in relation to a first torque flow extending from the first differential shaft to the first vehicle wheel, and
            a second transmission stage arranged between the second differential shaft and the second vehicle wheel in relation to a second torque flow extending from the second differential shaft to the second vehicle wheel.

2. The electric drive unit of claim 1, further comprising:
    a first switch unit configured to
        connect the ring gear to the first differential shaft in a manner fixed against rotation, or
        connect the ring gear to the second differential shaft in a manner fixed against rotation.

3. The electric drive unit of claim 2, further comprising:
    a second switch unit configured to connect the ring gear to a housing of the electric drive unit in a manner fixed against rotation.

4. The electric drive unit of claim 3, wherein the first switch unit is couplable to the second switch unit in such a way that the first and second switch units are switchable by a single actuator.

5. The electric drive unit of claim 4, wherein the first switch unit and the second switch unit are arranged axially overlapping the first rotor and radially within the first rotor, wherein the first switch unit is configured to connect the ring gear to the first differential shaft in a manner fixed against rotation.

6. The electric drive unit of claim 4, wherein the first switch unit is configured to connect the ring gear to the second differential shaft in a manner fixed against rotation, wherein, when viewed in an axial direction of the superimposed planetary gear set, the differential transmission, the superimposed planetary gear set, the second switch unit, and the first switch unit are arranged one after the other in the following order: 1) the differential transmission, 2) the superimposed planetary gear set, 3) the second switch unit, and 4) the first switch unit.

7. The electric drive unit of claim 3, wherein the first switch unit and the second switch unit are arranged axially overlapping the first rotor and radially within the first rotor, wherein the first switch unit is configured to connect the ring gear to the first differential shaft in a manner fixed against rotation.

8. The electric drive unit of claim 1, wherein the superimposed planetary gear set is arranged coaxially with the first rotor, axially overlapping the first rotor and radially within the first rotor.

9. The electric drive unit of claim 1, wherein the differential transmission is a bevel gear differential, wherein, when viewed in an axial direction of the first rotor, the first rotor, the differential transmission, the superimposed planetary gear set, and the second rotor are arranged one after the other in the following order: 1) the first rotor, 2) the differential transmission, 3) the superimposed planetary gear set, and 4) the second rotor.

* * * * *